US00RE40426E

(19) United States
(12) Reissued Patent
Gagnon et al.

(10) Patent Number: US RE40,426 E
(45) Date of Reissued Patent: Jul. 8, 2008

(54) METHOD OF MANUFACTURING A HOCKEY STICK BLADE WITH A BRAIDED FIBER ENVELOPE

(75) Inventors: Louis-Georges Gagnon, East Farnham (CA); Michael Quddus, St-Hyacinthe (CA)

(73) Assignee: Sport Maska Inc. (CA)

(21) Appl. No.: 11/702,035

(22) Filed: Feb. 2, 2007

Related U.S. Patent Documents

Reissue of:
(64) Patent No.: 7,125,352
Issued: Oct. 24, 2006
Appl. No.: 10/322,336
Filed: Dec. 17, 2002

(30) Foreign Application Priority Data

Dec. 17, 2001 (CA) ..... 2365484

(51) Int. Cl.
*A63B 59/14* (2006.01)

(52) U.S. Cl. ..... 473/563
(58) Field of Classification Search ..... 473/560–563, 473/559
See application file for complete search history.

(56) References Cited

U.S. PATENT DOCUMENTS

| | | | | |
|---|---|---|---|---|
| 4,148,482 | A | 4/1979 | Harwell et al. | 473/561 |
| 5,083,780 | A | 1/1992 | Walton et al. | 273/80 |
| 5,496,027 | A | 3/1996 | Christian et al. | 273/67 |
| 5,558,326 | A | 9/1996 | Adamson et al. | 473/563 |
| 5,888,601 | A | 3/1999 | Quigley et al. | 428/36.1 |
| 5,961,395 | A | 10/1999 | You | 473/316 |
| 5,997,970 | A | 12/1999 | You | 428/36.2 |
| 6,036,610 | A | 3/2000 | Lewark | 473/564 |
| 6,039,661 | A | 3/2000 | Christian et al. | 473/562 |
| 6,062,996 | A | 5/2000 | Quigley et al. | 473/563 |
| 6,129,962 | A | 10/2000 | Quigley et al. | 428/36.1 |
| 6,273,835 | B1 | 8/2001 | Battis et al. | 473/563 |
| 2001/0041633 | A1 | 11/2001 | Tutola | 473/560 |
| 2001/0046910 | A1 | 11/2001 | Sutherland | 473/564 |
| 2002/0198071 | A1 | 12/2002 | Snow | 473/564 |
| 2003/0104883 | A1 | 6/2003 | Caron | 473/560 |

FOREIGN PATENT DOCUMENTS

| | | |
|---|---|---|
| GB | 2018138 | 10/1979 |
| JP | 02001087437 A | 4/2001 |
| JP | 02001087437 | 4/2001 |

*Primary Examiner*—Mark S Graham
(74) *Attorney, Agent, or Firm*—Factor & Lake

(57) ABSTRACT

In this method, a braided fiber envelope is slid over the core of the hockey stick blade and a promoted resin is applied on the core and the fiber envelope. At least one pre-cured reinforcement panel is provided on at least one side of the blade. The resulting assembly is heat pressed so as to secure the reinforcement panel to the blade and shape the blade. A hockey stick shaft constructed in accordance with this method is also disclosed. This construction provides a lighter hockey stick blade with improved mechanical properties compared to previous ones.

4 Claims, 4 Drawing Sheets

METHOD OF MANUFACTURING A HOCKEY STICK BLADE WITH A BRAIDED FIBER ENVELOPE

Matter enclosed in heavy brackets [ ] appears in the original patent but forms no part of this reissue specification; matter printed in italics indicates the additions made by reissue.

BACKGROUND

Hockey stick blades have traditionally been made using a core to which is glued a hosel, both made of a material such as wood, ABS or polyurethane foam. The core and hosel are then covered by a layer of fleece or fiberglass over which reinforcement panels are fixed using a lamination process. The purpose of the fleece or fiberglass layer is to fill in any space present between the core, the hosel and the reinforcement panels. As part of the laminating process, the blade assembly is pressed to obtain the desired curve. This construction, however, has some drawbacks. One of them is that the fleece layer itself does not improve any substantial mechanical properties of the blade. When a fiberglass layer is used, the problem is that the spacing between the fibers is always very small and the angle between the fibers is fixed. The fiberglass layer material comes in rolls and is thus limited in terms of possible densities and geometries.

Another known construction included the addition of a twilled or plain weaved fiber envelope with a fiberglass layer over a laminated blade assembly in order to improve its mechanical properties. However, the disadvantages of such a construction is the usual presence of wrinkles in the fiber envelope, which lessens its potential added mechanical properties. These wrinkles are caused by the fiber envelope being applied to a blade having an already formed curve combined with the fact that the blade cannot be pressed a second time. A further disadvantage is that the fiber envelope is on the exterior surface of the blade and is exposed to impacts.

Also existing is a construction where dry reinforcement panels are added to the core and hosel, the blade curvature being formed through a resin transfer molding process or vacuum assisted resin transfer molding process. The disadvantages of such a construction is that it requires complex and expensive processes in order to obtain a consistent surface finish. Furthermore, a different mold is required for every blade profile and curvature, which is expensive and means that the blade profile and curvature must be known before starting the process. The cool down period required after the completion of the process is another disadvantage.

SUMMARY OF THE INVENTION

It is an object of the present invention to provide a hockey stick blade which reduces the difficulties and disadvantages of existing processes.

In accordance with one aspect of the present invention, there is provided a method of forming a hockey stick blade, the hockey stick blade having two sides, the method comprising: providing a core, sliding a braided fiber envelope over the core, applying a promoted resin on the core and the fiber envelope, providing at least one pre-cured reinforcement panel to at least one side of the blade and heat pressing the reinforcement panel towards the core so as to secure the reinforcement panel to the blade and shape the blade.

In accordance with another aspect of the present invention, there is provided a hockey stick blade comprising a core, an envelope of braided fiber surrounding the core, a layer of promoted resin on the core and the fiber envelope and at least one reinforcement panel secured on at least one side of the blade.

Other objects, aspects and advantages of the present invention will be found in the following detailed description of a preferred embodiment of the present invention. The description makes reference of the following accompanying figures.

DETAILED DESCRIPTION OF THE DRAWINGS

Figure 1:
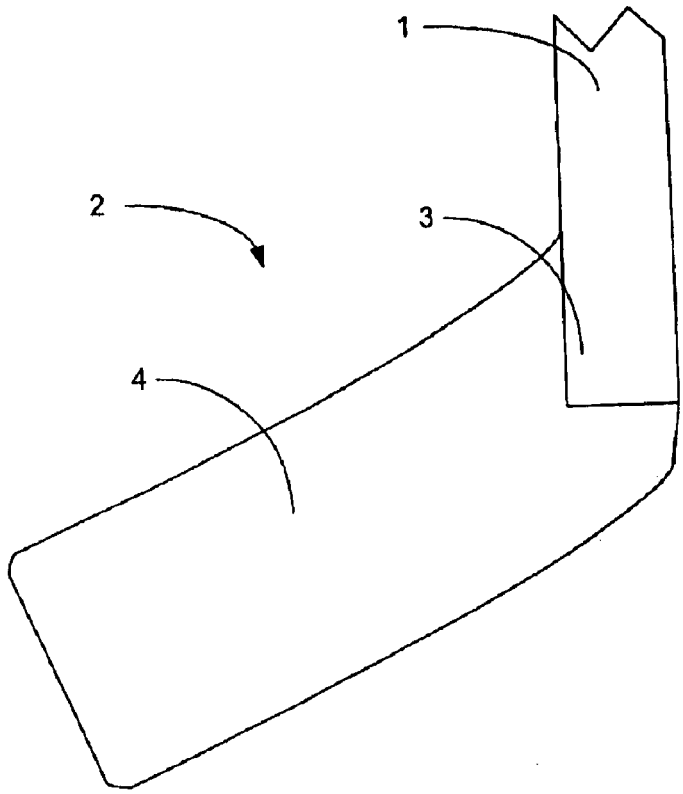
FIG. 1 is a schematic view of a hockey stick blade core.

As shown in FIG. 1, a blade (2) is the part of a hockey stick located at the lower end of a shaft (1). Both the shaft (1) and the blade (2) are joined together by a hosel (3).

The construction of the blade (2) begins by providing a core (4). The core (4) is preferably connected to the hosel (3) before the other components of the blade (2) are added.

The core (4) may be made of a wide range of materials. Examples are wood, acrylonitrile butadiene styrene (ABS) plastic, polyurethane foam, carbon, fiberglass, aramid, vinyl ester, polyester resins, or a combination of two or more of the preceeding. Of course, other materials with similar characteristics may be used as well. The core (4) is preferably initially straight, meaning that it does not have any pronounced curve.

If ABS is used to make the core (4) and hosel (3), then a layer of an acetone based primer (5) is preferably applied to the core (4) and hosel (3) at that stage. For example, the primer (5) can be applied by dipping the core (4) and hosel (3) into the liquid primer (5) or by spraying the primer (5) thereon. The primer (5) is a chemical coating used to soften the ABS surface and promote the bonding to the core (4) and hosel (3) of the other components of the blade (2).

Figure 2:
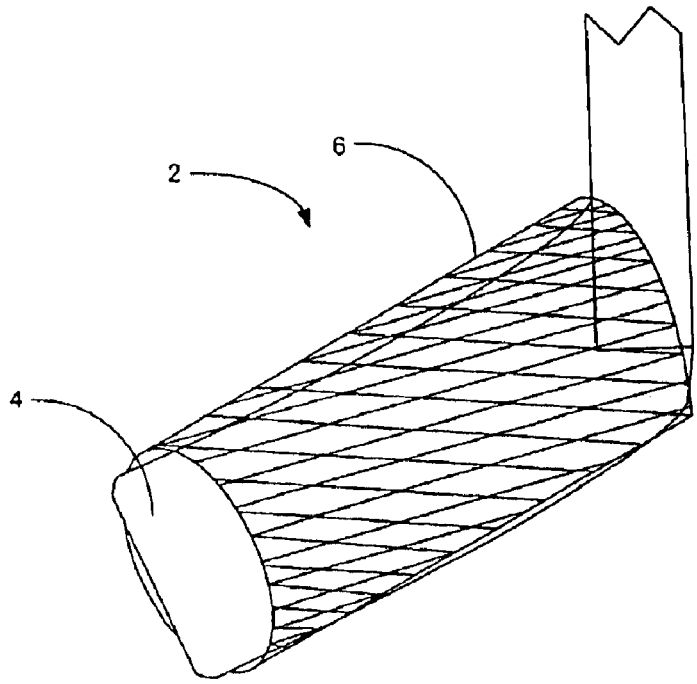
FIG. 2 is a schematic view of a braided fiber envelope being slid over the hockey stick blade core.
Figure 3:
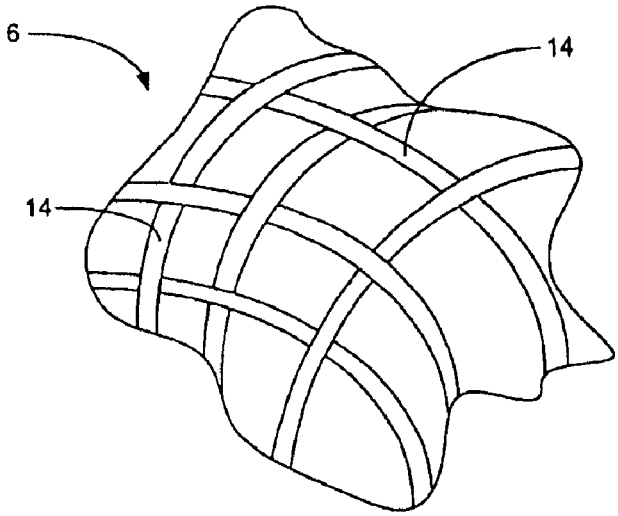
FIG. 3 is an enlarged view an example of the braided fibers of the envelope.
Figure 4:
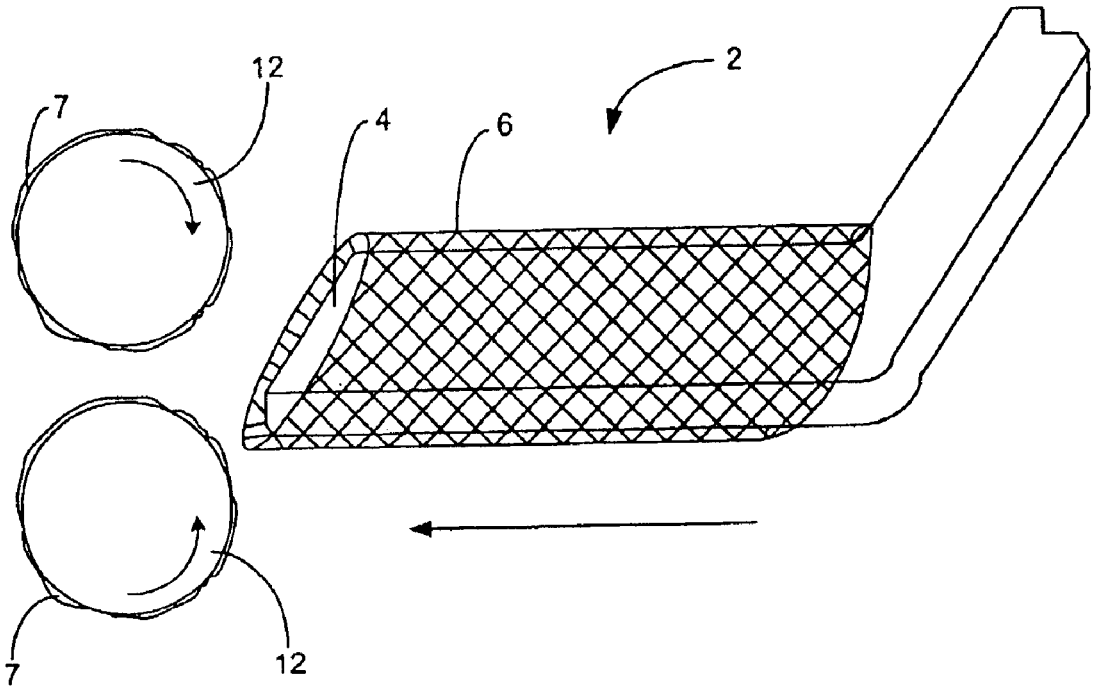
FIG. 4 is a schematic view of the core with the braided fiber envelope being inserted between rollers.
Figure 5:
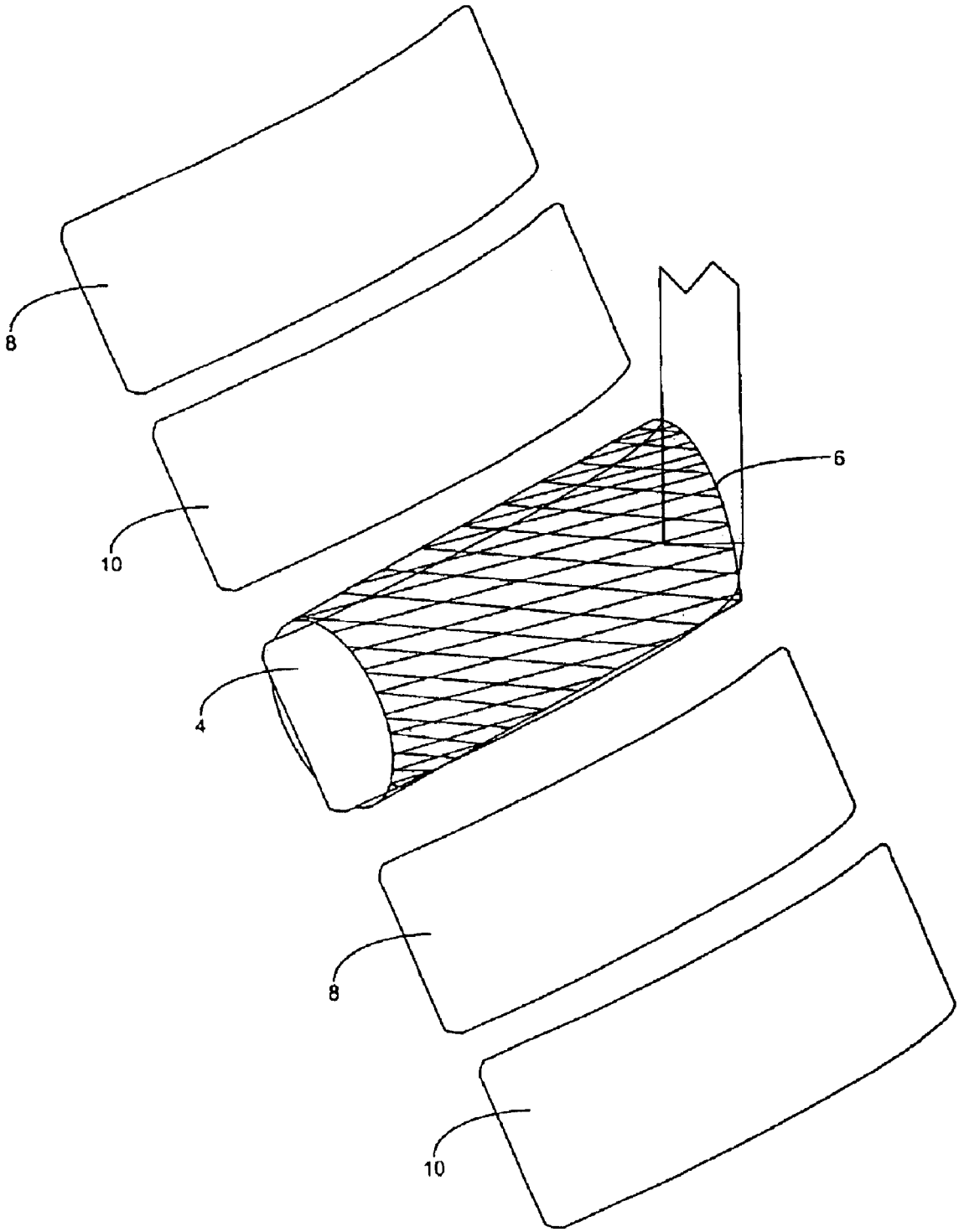
FIG. 5 is an exploded view of the hockey stick blade.

As schematically shown in FIG. 2, an envelope (6) composed of braided fibers is opened and slid onto the core (4) and hosel (3) either manually or mechanically,. As best shown in FIG. 3, the braided fibers (14) forming the braided fiber envelope (6) are threaded over and under each other to form a tube. The fibers (14) may be made, for example, of carbon of fiberglass. The angle between the crossing fibers (14) and the diameter of the braided fiber envelope (6) are selected to obtain specific mechanical properties, such as stiffness and strength. Commercially available braided fiber envelopes (6) may be ordered with the desired specific parameters. Examples of such commercially available products are the Gammasox™ braided carbon fiber envelope and the Silasox™ braided fiberglass fiber envelope.

Furthermore, the angle between the crossing fibers can be varied locally over the length of the core (4) and hosel (3) in order to obtain various desired mechanical properties. This may be achieved by stretching the fiber braided envelope (6) since the core (4) has not undergone any pressing operation at this stage. It should be noted that the envelope (6) is preferably elastically tighten over the core (4) once set in place, notwithstanding what is shown in the figures.

Once the envelope (6) is in place, a promoted resin (7), such as Araldite™ apoxy, is applied. This is preferably achieved by inserting the core (4), hosel (3) and braided fiber envelope (6) between transfer rollers (12). The promoted resin (7) allows to glue the braided fiber envelope (6) to the core (4) and hosel (3).

A pre-cured reinforcement panel (8) is added to either or both sides of the assembly formed by the core (4), hosel (3) and the braided fiber envelope (6) in order to provide structural support to the blade (2). The reinforcement panel (8) is made, for example, of carbon, fiberglass or Kevlar™. The expression "pre-cured" refers to the fact that at least one side of the panel (8) is chemically treated with a heat activated adhesive. Furthermore, a pre-cured graphic panel (10), which may be made of similar material as the reinforcement panel (8) or may be in the form of a thin film of a light weight material, may also be applied to either or both sides of the assembly formed by the core (4), hosel (3) and the braided fiber envelope (6). The addition of a graphic panel (10) is for branding or advertisement purposes as well as added impact protection. If present, the reinforcement panels (8) and graphic panels (10) may be added to the assembly in any order desired. In the case where a graphic panel (10) is placed under a reinforcement panel (8), the overlaying reinforcement panel (8) may be transparent so as to permit the viewing of the graphic panel (10).

Once assembled, the blade (2) is heated and pressed in order to complete the laminating process and obtain the desired blade curvature. The desired blade curvature is obtained by selecting appropriately shaped plates for the press. Finally, the blade (2) is sanded and machined to obtain the required profile.

Figure 6:
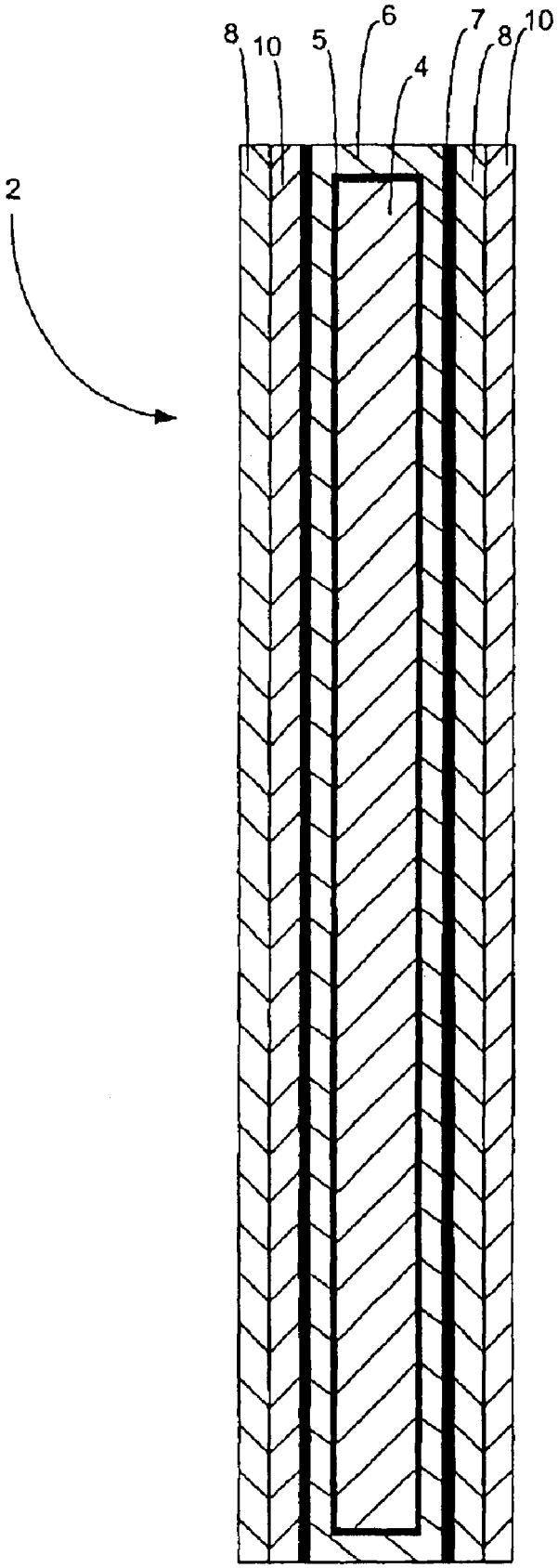
FIG. 6 is a cross-sectional view of the resulting assembly.

The resulting construction of the blade (2) according to the preferred embodiment of the present invention is shown in FIG. 6. Although the primer (5) and the promoted resin (7) are shown in FIG. 6 as distinct layers disposed in the order in which they are preferably applied, it should be noted that in the primer (5) if any, and the promoted resin (7) are impregnated within the fiber braided envelope (6). The thickness of the various layers are also exagerated for the purpose of illustration. As can be appreciated, this construction results in the core (4) and the braided fiber envelope (6) being protected by one or more reinforcement panels (8), and possibly by graphic panels (10), all of which provides higher stiffness to weight ratio than in the prior art constructions. This is due to the fact that in the prior art a twilled or plain weaved fiber envelope was added over the reinforcement panel (8), requiring a layer of fleece or fiberglass to fill any space between the core, the hosel and the reinforcement panel. The fleece adds no mechanical properties to the blade while the fiberglass only adds minimal mechanical properties. Furthermore, the braiding in the present invention has better mechanical properties of the fibers than a twill or weave. Since the fiber braided envelope (6) and promoted resin (7) are applied between the core (4), the hosel (3) and the reinforcement panel (8), no additional filler, such as fleece or fiberglass, is needed. Overall, this provides for a lighter blade with improved mechanical properties.

What is claimed is:

1. A hockey stick blade having a core having opposed top and bottom edges, opposed first and second side surfaces spacing apart said opposed top and bottom edges, a toe portion and a heel portion, each said side surfaces comprising an upper perimeter disposed adjacent said top edge and a lower perimeter disposed adjacent said bottom edge, a layer of braided reinforcing fibers permanently disposed on each of said opposed first and second side surfaces, pre-cured reinforcement panels having opposed proximal and distal side surfaces, at least one pre-cured reinforcement panel being permanently disposed on the outside of each of said layer of braided reinforcing fibers, such that said proximal side surface is in contact with said braided reinforcing fibers, said distal surface having a smooth surface, wherein the angle of said braided reinforcing fibers varies locally on said first and second side surfaces.

2. A hockey stick blade having a core having opposed top and bottom edges, opposed first and second side surfaces spacing apart said opposed top and bottom edges, a toe portion and a heel portion, each said side surfaces comprising an upper perimeter disposed adjacent said top edge and a lower perimeter disposed adjacent said bottom edge, a layer of braided reinforcing fibers permanently disposed on each of said opposed first and second side surfaces, pre-cured reinforcement panels having opposed proximal and distal side surfaces, at least one pre-cured reinforcement panel being permanently disposed on the outside of each of said layer of braided reinforcing fibers, such that said proximal side surface is in contact with said braided reinforcing fibers, said distal surface having a smooth surface, wherein the angle of said braided reinforcing fibers varies along said first and second side surfaces from said heel portion to said toe portion.

3. A hockey stick blade having a laminated construction comprising in order from the inside to the outside a core having opposed top and bottom edges, opposed first and second side surfaces spacing apart said opposed top and bottom edges, a toe portion and a heel portion, each said side surfaces comprising an upper perimeter disposed adjacent said top edge and a lower perimeter disposed adjacent said bottom edge, a layer of braided reinforcing fibers permanently affixed to each of said opposed first and second side surfaces, pre-cured reinforcement panels having opposed proximal and distal side surfaces, at least one pre-cured reinforcement panel being permanently affixed on the outside of each of said layer of braided reinforcing fibers, such that said proximal side surface is in contact with said braided reinforcing fibers, said distal surface having a smooth surface, wherein said core, said layer of braided reinforcing fibers and said pre-cured reinforcement panels are assembled together prior to said blade being heat pressed and shaped, wherein the angle of said braided reinforcing fibers varies locally on said first and second side surfaces.

4. A hockey stick blade having a laminated construction comprising in order from the inside to the outside a core having opposed top and bottom edges, opposed first and second side surfaces spacing apart said opposed top and bottom edges, a toe portion and a heel portion, each said side surfaces comprising an upper perimeter disposed adjacent said *top edge and a lower perimeter disposed adjacent said* bottom edge, a layer of braided reinforcing fibers permanently affixed to each of said opposed first and second side surfaces, pre-cured reinforcement panels having opposed proximal and distal side surfaces, at least one pre-cured reinforcement panel being permanently affixed on the outside of each of said layer of braided reinforcing fibers, such that said proximal side surface is in contact with said braided reinforcing fibers, said distal surface having a smooth surface, wherein said core, said layer of braided reinforcing fibers and said pre-cured reinforcement panels are assembled together prior to said blade being heat pressed and shaped[.], wherein the angle of said braided reinforcing fibers varies along said first and second side surfaces from said heel portion to said toe portion.

* * * * *